United States Patent
Masatsugu

(10) Patent No.: US 7,950,444 B2
(45) Date of Patent: May 31, 2011

(54) AUTOMOTIVE AIR CONDITIONING SYSTEM

(75) Inventor: Akira Masatsugu, Toyoake (JP)

(73) Assignee: Denso Corporation, Kariya (JP)

( * ) Notice: Subject to any disclaimer, the term of this patent is extended or adjusted under 35 U.S.C. 154(b) by 1273 days.

(21) Appl. No.: 11/543,395

(22) Filed: Oct. 5, 2006

(65) Prior Publication Data

US 2007/0181295 A1 Aug. 9, 2007

(30) Foreign Application Priority Data

Oct. 7, 2005 (JP) ................................. 2005-294731

(51) Int. Cl.
*B60H 1/00* (2006.01)
*B60H 1/32* (2006.01)
(52) U.S. Cl. ............. 165/42; 165/43; 165/202; 165/204; 454/121; 454/126; 454/156; 454/159; 454/160; 454/161; 237/12.3 A; 237/12.3 B
(58) Field of Classification Search .................. 165/202, 165/204, 42, 43; 454/121, 126, 156, 159, 454/160, 161; 237/12.3 A, 12.3 B
See application file for complete search history.

(56) References Cited

U.S. PATENT DOCUMENTS

| | | |
|---|---|---|
| 2004/0093884 A1 | 5/2004 | Seki et al. |
| 2004/0152410 A1 | 8/2004 | Seki |

FOREIGN PATENT DOCUMENTS

| | | | |
|---|---|---|---|
| DE | 19916992 A1 | * | 11/1999 |
| DE | 10025334 A1 | * | 11/2000 |
| EP | 1013491 A1 | * | 6/2000 |
| JP | U-62-127808 | | 8/1987 |
| JP | 2002-370520 | | 12/2002 |
| JP | A-2004-098883 | | 4/2004 |
| JP | 2004-155263 | | 6/2004 |
| JP | 2004-224200 | | 8/2004 |
| JP | A-2005-119451 | | 5/2005 |

OTHER PUBLICATIONS

Office Action dated Mar. 18, 2010 in corresponding JP Application No. 2005-294731 with English translation.

* cited by examiner

*Primary Examiner* — John K Ford
(74) *Attorney, Agent, or Firm* — Harness, Dickey & Pierce, PLC

(57) ABSTRACT

An automotive air conditioning system is disclosed. At the foot mode position of a rotary door 25, a gap T is formed along the door diameter between a circumferential end of a door surface 25c of the rotary door 25 and a seal rib 28 of a case 11. The flow path of a foot opening 22 communicates with a defroster opening 20 through the gap T. At the defroster mode position of the rotary door 25, on the other hand, the other circumferential end of the door surface 25c comes into contact with the seal rib 28 and closes the gap T, and the door surface 25c closes up the foot opening 22. Even upon slight rotation of the foot rotary door under the air pressure of the foot mode, therefore, the defroster blowout air amount and the foot blowout air amount are kept in a predetermined proportion.

4 Claims, 11 Drawing Sheets

AUTOMOTIVE AIR CONDITIONING SYSTEM

BACKGROUND OF THE INVENTION

1. Field of the Invention

This invention relates to a blowout mode switching mechanism for an automotive air conditioning system.

2. Description of the Related Art

Japanese Unexamined Patent Publication No. 2004-155263 proposes a conventional automotive air conditioning system in which a defroster opening 20, a center face opening 21a and a foot opening 22 are opened/closed by two rotary doors 25, 26 as shown in FIGS. 10 to 12.

Specifically, the foot opening 22 and a defroster/face communication path 27a are opened/closed by the first rotary door 25, and the defroster opening 20 and the center face opening 21a are arranged downstream of the communication path 27a and are opened/closed by the second rotary door 26. The rotary doors 25, 26 have door surfaces 25c, 26c rotatable integrally with each of the rotary shafts 25a, 25b, 26a, 26b. The door surfaces 25c, 26c are positioned a predetermined distance radially away from the center of each of the rotary shafts.

FIGS. 10, 11 show the foot mode in the prior art. FIG. 10 shows the maximum heating state in which a cool air path 16 is closed up by an air mix door 14, and FIG. 11 an intermediate temperature control state in which the air mix door 14 is operated at the intermediate opening degree position.

In foot mode operation, the first rotary door 25 is operated to a position rotated clockwise by a small angle θ from the closed-up position of the defroster/face communication path 27a. As a result, a gap X is formed between the first rotary door 25 and a case-side seal surface 11g. Therefore, the first rotary door 25 opens the communication path 27a by a small amount at the gap X while at the same time opening the foot opening 22 almost fully.

In the process, the second rotary door 26 fully opens the defroster opening 20 and closes the center face opening 21a. Most of the air-conditioning air adjusted in temperature by the air mix door 14 flows toward the foot opening 22 and is blown out, toward the feet of the occupants, from the foot air outlets 24a, 24b.

Part of the air-conditioning air flows toward the defroster opening 20 through the gap X portion of the communication path 27a and exhibits the function of defrosting the window glass of the automotive vehicle. FIG. 12 shows the intermediate temperature control state of the foot/defroster mode in which the defroster/face communication path 27a and the foot opening 22 are both half opened by the first rotary door 25.

In the case where the first rotary door 25 changes the stop position (rotational angle θ) thereof under the air pressure in foot mode, the size of the gap X also changes. Therefore, the proportion in the blowout air amount between the defroster opening 20 and the foot opening 22 undesirably undergoes a change. As a result, it becomes difficult to maintain an appropriate preset proportion between the defroster blowout air amount and the foot blowout air amount.

Also, in the intermediate temperature control state in the foot mode shown in FIG. 11 or the foot/defroster mode shown in FIG. 12, the opening of the defroster/face communication path 27a is in proximity to the cool air path 16 and the foot opening 22 is in proximity to the outlet of a warm air path 18 downstream of a heater core 15. Therefore, cool air is liable to flow from the cool air path 16 toward the defroster opening 20, while the warm air in the warm air path 18 is liable to flow toward the foot opening 22.

As a result, the temperature difference (vertical blowout temperature difference) between the blowout air temperature of the defroster opening 20 and the blowout air temperature of the foot opening 22 becomes excessive, so that the defrosting performance of the defroster opening 20 is deteriorated by the excessive reduction in the blowout air temperature. Also, the excessive rise of the blowout air temperature at the foot opening 22, on the other hand, inconveniently deteriorates the comfort of the occupants.

SUMMARY OF THE INVENTION

In view of this situation, an object of this invention is to provide an automotive air conditioning system using a rotary door, as a foot door means, at least adapted to open/close the foot opening, wherein the defroster blowout air amount and the foot blowout air amount can be maintained in a predetermined proportion in the foot mode.

Another object of this invention is to provide an automotive air conditioning system in which the proper vertical blowout temperature difference can be set in both foot mode and foot/defroster mode.

In order to achieve the aforementioned objects, according to this invention, there is provided an automotive air conditioning system comprising:

a heating heat exchanger (15) for heating the air, arranged in a case (11) in which the air flows toward the compartments; and a defroster opening (20) and a foot opening (22) arranged downstream of the heating heat exchanger (15) in the air flow in the case (11);

wherein a blowout mode door for opening/closing the defroster opening (20) and the foot opening (22) is configured as a rotary door (25) including rotary shafts (25a, 25b) and a door surface (25c) rotated integrally with the rotary shafts (25a, 25b) at a position a predetermined distance diametrically outward of the center of the rotary shafts (25a, 25b), wherein the case (11) is formed with a seal rib (28) forming an opening edge portion of the foot opening (22), wherein upon rotation of the rotary door (25) to the foot mode position to open the foot opening (22), a gap (T) along the door diameter is formed between one circumferential end of the door surface (25c) and the seal rib (28), and the flow path of the foot opening (22) communicates with the defroster opening (20) through the gap (T), and wherein upon rotation of the rotary door (25) to the defroster mode position to open the defroster opening (20), the other circumferential end portion of the door surface (25c) comes into contact with and closes the gap (T) so that the door surface (25c) closes up the foot opening (22).

In foot mode, therefore, the flow path of the foot opening (22) can communicate with the defroster opening (20) through the gap (T) formed along the diameter of the rotary door (25). As a result, most of the warm air flowing into the flow path of the foot opening (22) can be blown out to and heat the feet of the occupants from the foot opening (22), while at the same time causing part of the warm air of the foot opening (22) to flow into the defroster opening (20) from the gap (T), which warm air is blown out toward the vehicle window glass from the defroster opening (20) thereby to defrost the vehicle window glass.

In the process, the gap (T) is formed along the door diameter between a circumferential end portion of the door surface (25c) and the seal rib (28), and therefore the size of the gap (T)

is basically not affected by the rotational position of the rotary door (25). Even in the case where the rotary door (25) is rotated slightly under air pressure in foot mode, therefore, the gap (T) remains substantially the same size. As a result, the defroster blowout air amount and the foot blowout air amount in foot mode can be maintained in a preset proper proportion.

Also, the warm air flowing into the defroster opening (20) in foot mode branches from the foot opening (22) through the gap (T) and, therefore, a phenomenon is avoided in which the cool air flow bypassing the heating heat exchanger (15) flows only into the defroster opening (20).

As a result, an excessive reduction in the blowout air temperature of the defroster opening (20) in foot mode can be suppressed, and the temperature difference between the blowout air temperature of the defroster opening (20) and the blowout air temperature of the foot opening (22) (vertical blowout air temperature difference) can be easily set at a proper value.

According to a specific aspect of this invention, the diametrical size (L1) of a circumferential end portion of the door surface (25c) is set smaller than the diametrical size (L2) of the other circumferential end portion of the door surface (25c). In this way, a gap (T) is formed in the foot mode position, while the gap (T) is closed in the defroster mode position.

Specifically, by differentiating the diametrical size between one and the other circumferential ends of the door surface (25c), the gap (T) along the door diameter can be formed or closed.

Also, according to a specific aspect of the invention, there is provided an automotive air conditioning system, wherein a cool air path (16) is formed in parallel to the heating heat exchanger (15), and the proportion of the air amount between the warm air passing through the heating heat exchanger (15) and the cool air passing through the cool air path (16) is adjusted by an air mix door (14), wherein the foot/defroster mode is set upon rotation of the rotary door (25) to the intermediate position between the foot mode position and the defroster mode position, wherein in the foot/defroster mode position of the rotary door (25), the other circumferential end portion of the door surface (25c) is separated away from the seal surface (11g) formed on the case (11), so that the cool air path (18) and the warm air path (16) downstream of the heating heat exchanger (15) communicate with the defroster opening (20) through the side part of the rotary door (25), while at the same time, the cool air path (18) and the warm air path (16) communicate with the foot opening (22) through the inside part of the rotary door (25), and wherein a gap (T') along the door diameter is formed between the circumferential intermediate portion of the door surface (25c) and the seal rib (28), and the flow path of the foot opening (22) communicates with the defroster opening (20) through the gap T'.

In foot/defroster mode (FIG. 2), unlike in the foot mode, the foot blowout air amount is reduced by increasing the defroster blowout air amount. Also, in this foot/defroster mode, the warm air can be introduced into the defroster opening (20) through the gap T' along the door diameter formed between the door surface (25c) and the seal rib (28) (arrow c in FIG. 3).

The warm air flow passing through the gap T' acts as what is called the warm air bypass in foot/defroster mode. Even in foot/defroster mode, therefore, the excessive reduction in the blowout air temperature of the defroster opening (20) can be suppressed and an appropriate temperature difference can be easily set between the blowout air temperature of the defroster opening (20) and the blowout air temperature of the foot opening (22) (vertical blowout temperature difference).

Also, according to a specific aspect of this invention, there is provided an automotive air conditioning system, wherein the case (11) includes a face opening (21a) downstream of the heating heat exchanger (15) in the air flow, wherein the rotary door (25) is configured to open/close a path between a communication path (27a), communicating with the defroster opening (20) and the face opening (21a), and the foot opening (22), and wherein the defroster opening (20) and the face opening (21a) can be opened/closed by a door (26) other than the rotary door (25).

Also, according to a specific aspect of the invention, there is provided an automotive air conditioning system, wherein the face opening having a center face opening (21a), and side face openings (21b, 21c) are arranged on the left and right sides of the center face opening (21a), and wherein the profile of the rotary door (25) is so configured that the communication paths (27b, 27c) communicating with the side face openings (21b, 21c) always communicate with the downstream side of the heating heat exchanger (15) in the air flow for all the rotational positions of the rotary door (25).

In this configuration, the function can be achieved in which the air-conditioning air is always blown out from the side face openings (21b, 21c) at all the rotational positions of the rotary door (25), i.e. in all the blowout modes switchable by the rotary door (25).

Also, according to a specific aspect of the invention, there is provided an automotive air conditioning system, wherein a communication path (27a) of the defroster opening (20) and the center face opening (21a) is arranged as a first communication path at the central portion in the case (11), and wherein communication paths (27b, 27c) of the side face openings (21b, 21c) are arranged as second communication paths on the left and right sides of the first communication path (27a) in the case (11), wherein partitioning walls (11f) for defining the first communication path (27a) and the second communication paths (27b, 27c) are arranged on the left and right sides of the first communication path (27a) in the case (11), wherein the door surface (25c) of the rotary door (25) constitutes the central door surface located between the left and right partitioning walls (11f), and the rotary door (25) is formed with left and right door surfaces (25d, 25e) located on the left and right sides, respectively, of the central door surface (25c), wherein the diametrical size of the left and right door surfaces (25d, 25e) is smaller than the diametrical size of the central door surface (25c), and the boundary between the central door surface (25c) and the left and right door surfaces (25d, 25e) is stepped, and wherein the stepped boundary and the end surfaces of the left and right partitioning walls (11f) combine to form a labyrinth structure (30).

In this configuration, the labyrinth structure (30) suppresses the air flow (inflow and outflow) between the first communication path (27a) and the second communication paths (27b, 27c) and, therefore, the proportion between the defroster blowout air amount and the foot blowout air amount can be accurately maintained at a proper value in foot mode.

Also, according to a specific aspect of the invention, there is provided an automotive air conditioning system, wherein upon rotation of the rotary door (25) to a position where the foot opening (22) is closed up, the end surfaces of the left and right partitioning walls (11f) are located at a position intermediate between the diametrical size of the central door surface (25c) and the diametrical size of the left and right door surfaces (25d, 25e).

In this configuration, the required minimum gap can be secured to assure smooth rotation of the rotary door (25) between the end surface of the partitioning walls (11f) and the left and right door surfaces (25d, 25e), while at the same time bringing the end surfaces of the partitioning walls (11f) as close to the left and right door surfaces (25d, 25e) as possible. As a result, the air flow in the labyrinth structure (30) can be more effectively suppressed.

The reference numerals in the parentheses attached to each name of means described above and in the appended claims indicate the correspondence with the specific means described in the embodiments later.

The present invention may be more fully understood from the description of preferred embodiments of the invention, as set forth below, together with the accompanying drawings.

DESCRIPTION OF THE PREFERRED EMBODIMENTS

First Embodiment

Figure 1:
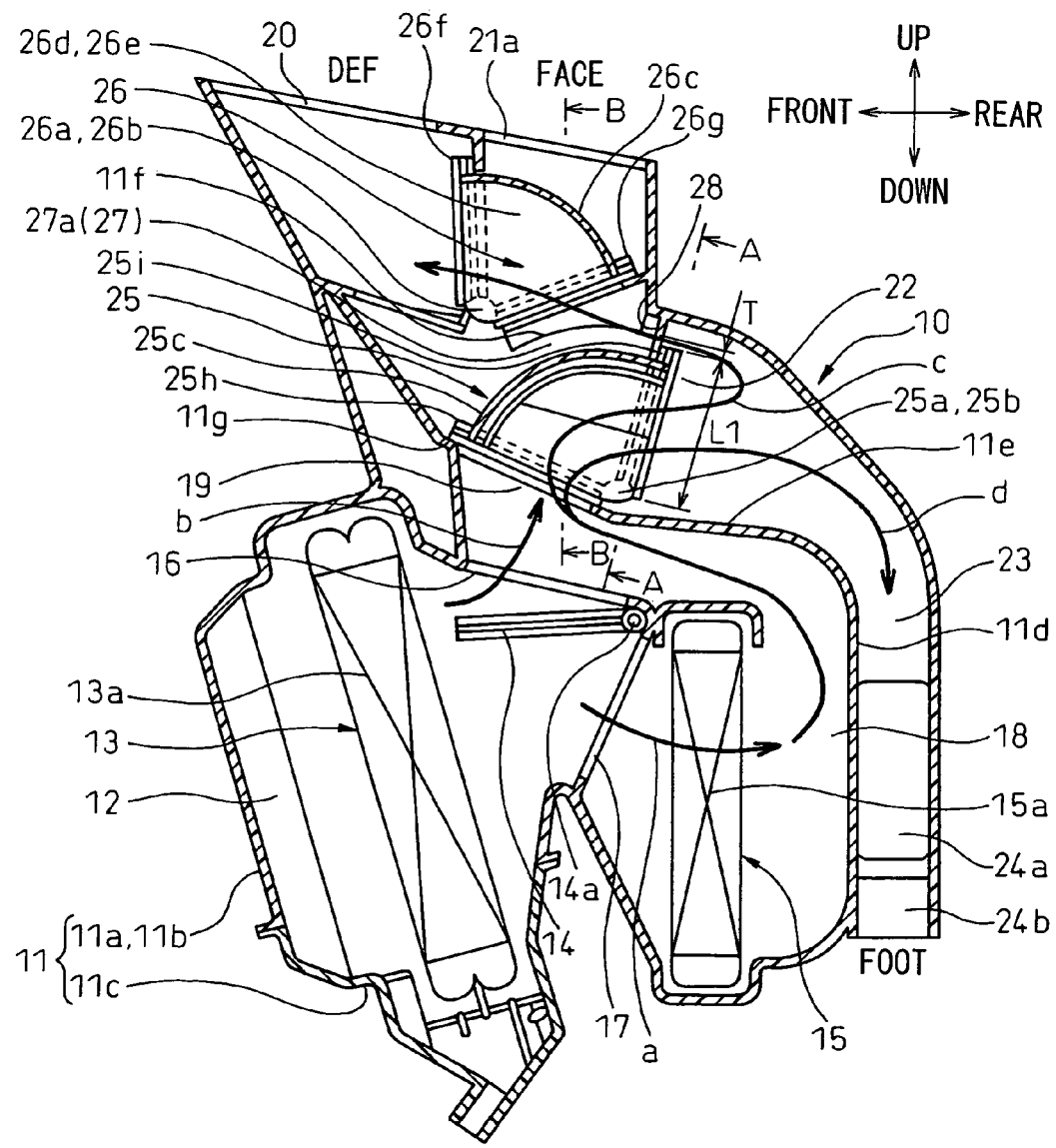
FIG. 1 is a sectional view showing the foot mode according to a first embodiment of the invention.
Figure 2:
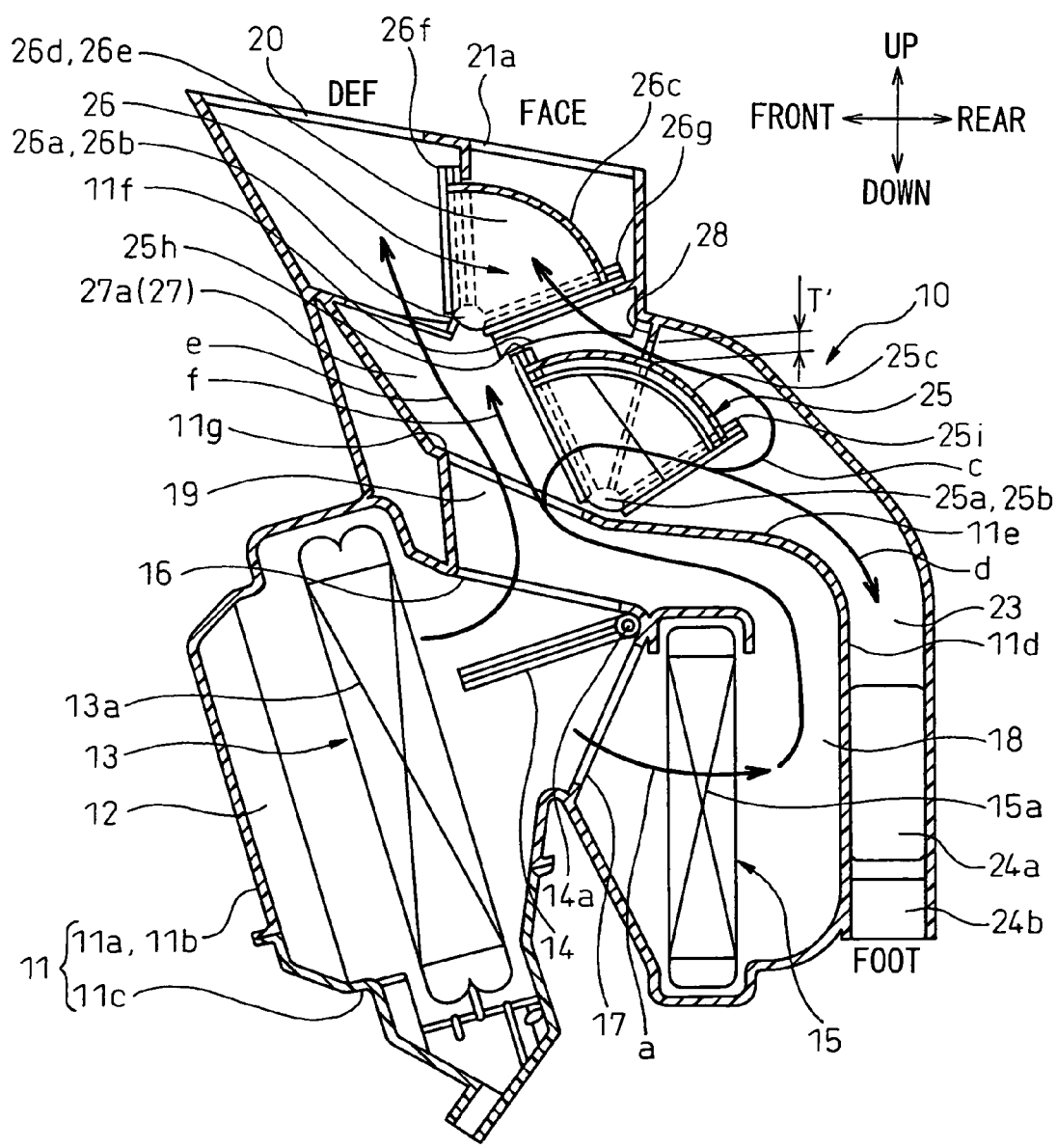
FIG. 2 is a sectional view showing the foot/defroster mode according to the first embodiment of the invention.
Figure 3:
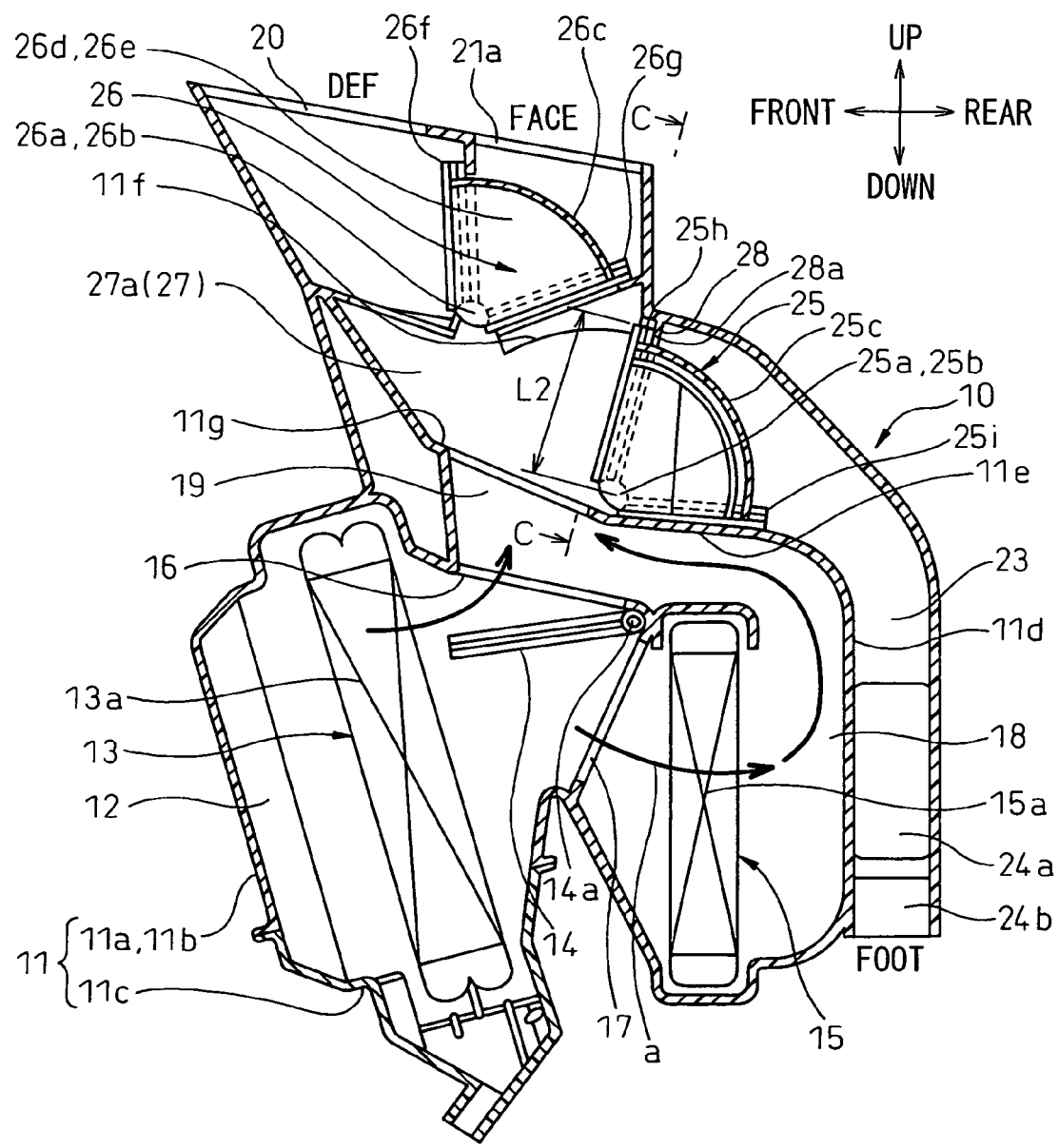
FIG. 3 is a sectional view showing the defroster mode according to the first embodiment of the invention.

FIGS. 1 to 8 show a first embodiment of the invention. FIGS. 1 to 3 are longitudinal sectional views of an air-conditioning unit 10 accommodating a heat exchanger unit and constituting an inside unit of a air conditioning system for an automotive vehicle. FIG. 1 shows the operation in foot mode and FIG. 2 the operation in foot/defroster mode. FIG. 3 shows the operation in defroster mode constituting a blowout mode for closing up the foot opening.

The air-conditioning unit 10 is arranged inside the instrument panel (not shown) in the front compartment and substantially in the transversely (laterally) central portion of the vehicle. In FIGS. 1 to 3, the arrows indicating "up", "down", "front" and "rear" represent the directions as viewed from the air conditioning system mounted on the vehicle. The inside unit of the automotive air conditioning system roughly includes an air-conditioning unit 10 located substantially at the central portion and a blower unit, not shown, arranged in a position offset to the front passenger seat in the instrument board.

The blower unit includes an inside-outside air switch box for switching the introduction of the outside air (air outside the compartments) and the inside air (air inside the compartments), as is well known, and a centrifugal blower for blowing the air introduced into the inside-outside air switch box. The air blown from the blower unit flows into the foremost air inflow space 12 in a case 11 of the air-conditioning unit 10.

The case 11 constitutes the path of the air flowing into the compartments and is molded from a resin having some degree of elasticity and mechanical strength, like polypropylene. The case 11, for the convenience of releasing dies in the molding process and mounting the air-conditioning units therein, is specifically molded as a plurality of division cases which are fastened, integrally, to each other after molding.

Figure 6:
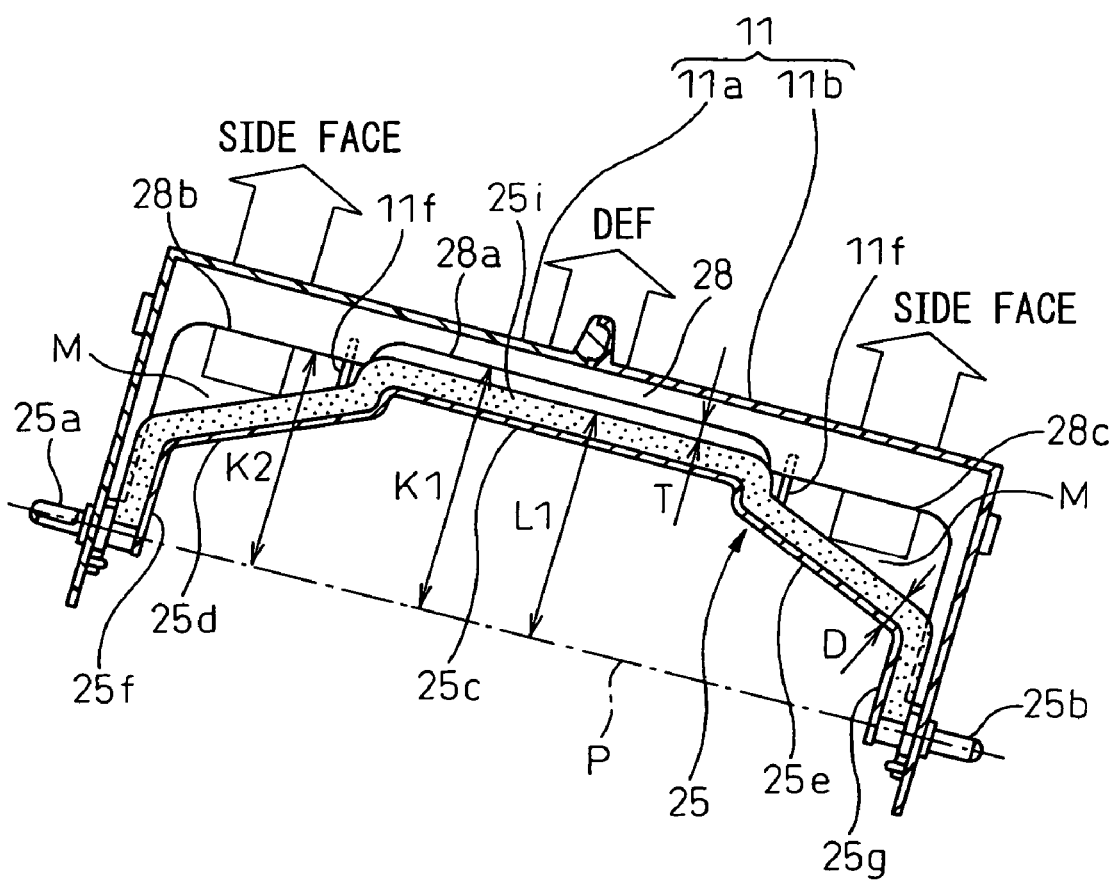
FIG. 6 is a sectional view taken in line A-A in FIG. 1.
Figure 7:
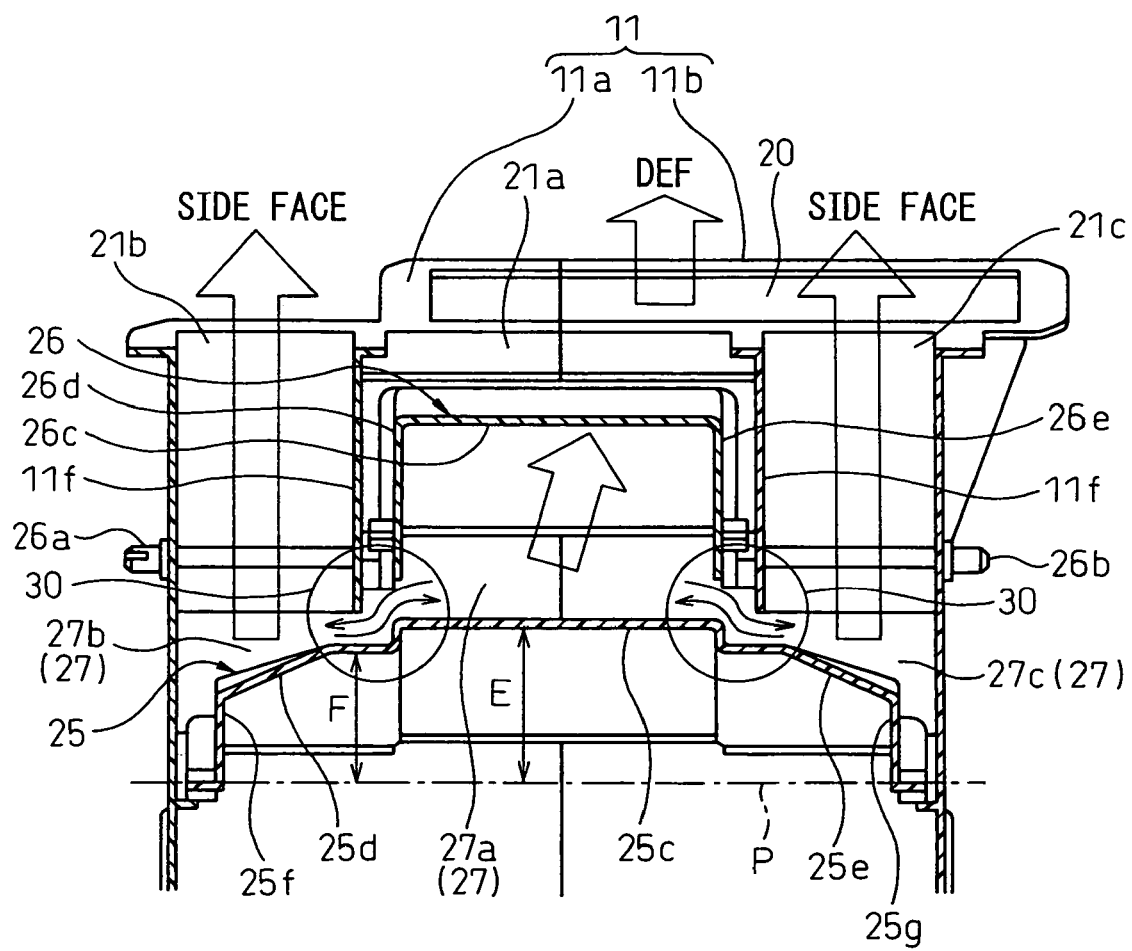
FIG. 7 is a sectional view taken in line B-B in FIG. 1.
Figure 8:
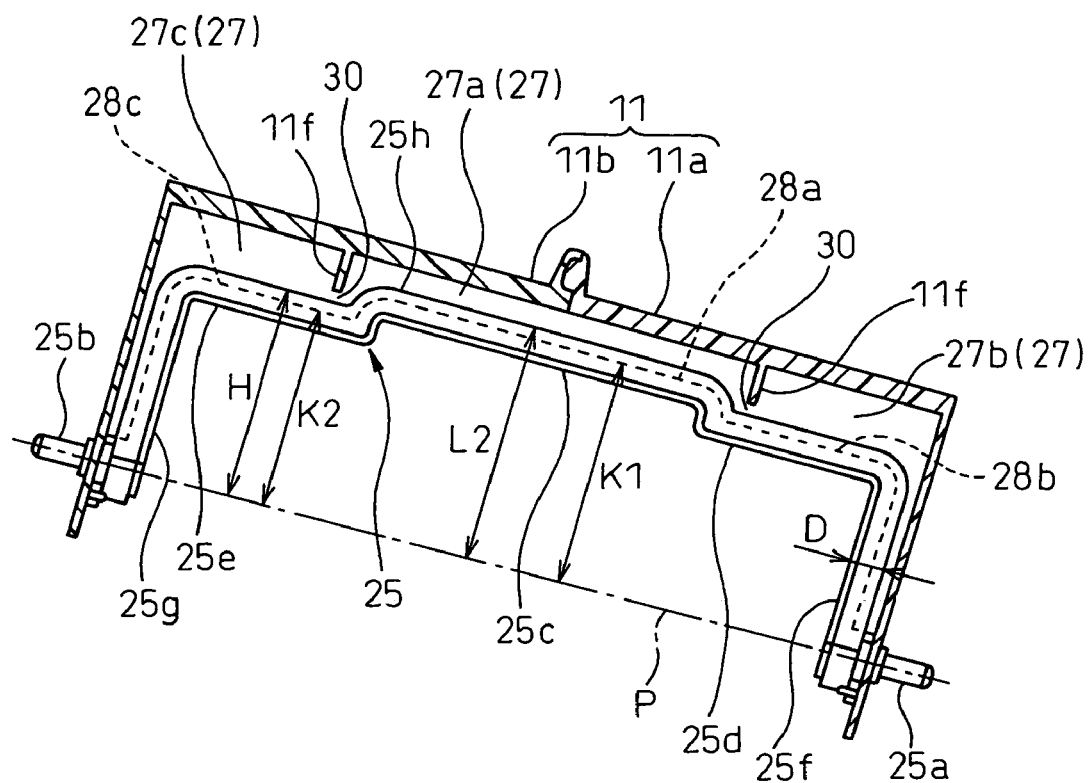
FIG. 8 is a sectional view taken in line C-C in FIG. 3.

In this embodiment, the case 11 is configured of upper left and right division cases 11a, 11b and a lower division case 11c. The dividing positions of the upper left and right division cases 11a, 11b are illustrated in FIGS. 6 to 8 as described later.

An evaporator 13 making up a cooling heat exchanger is arranged substantially vertically, but at a small angle, in the rear of the air inflow space 12 in the case 11. Specifically, the evaporator 13 is arranged in longitudinal position with the air inflow and outflow surfaces of the core portion 13a extending vertically.

The air blown from the blower unit, after flowing to the air inflow space 12, passes rearward through the core portion 13a of the evaporator 13 from the space 12. A low-pressure refrigerant decompressed by a decompressor, such as an expansion valve of the refrigeration cycle for the automotive air conditioning system, flows into the evaporator 13, as is well known, and the low-pressure refrigerant absorbs heat from the blown air and is evaporated thereby to cool the blown air.

An air mix door 14, and a heater core 15 of a warm water type making up a heating heat exchanger, are arranged in the rear downstream in the air flow of the evaporator 13. The air mix door 14 is configured of a cantilever plate door adapted to rotate around a rotary shaft 14a.

The heater core 15, as is well known, is for heating the air with the warm water (cooling water) of the vehicle engine as a heat source. The air inflow and outflow surfaces of the core unit 15a of the heater core 15 are longitudinally arranged in such a manner as to extend vertically.

A cool air path 16 is formed in the front portion of the upper end of the heater core 15 in the case 11, and the air (cool air) that has passed through the evaporator 13 flows through the cool air path 16, bypassing the heater core 15, as indicated by arrow b in FIG. 1.

The air mix door 14 is rotated vertically between the evaporator 13 and the heater core 15 thereby to open/close the cool air path 16 and the inlet air path 17 of the heater core 15. As a result, the proportion of the air amount between the warm air (indicated by arrow a) passed through and heated by the heater core inlet air path 17 and the cool air (indicated by arrow b) passing through the cool air path 16 can be adjusted to thereby adjust the temperature of the air blown out into the compartments. Thus, the air mix door 14 makes up a temperature adjust means for the air blown into the compartments.

The rotary shaft 14a of the air mix door 14 is rotatably supported in the bearing holes (not shown) of the left and right side wall portions of the case 11, while an end of the rotary shaft 14a is projected out of the case 11 and coupled to the air mix door mechanism. An actuator mechanism with a motor is normally used as the air mix door mechanism. Nevertheless, a manual operation mechanism can be used instead of the actuator mechanism.

A warm air guide wall 11d is formed integrally with the upper division cases 11a, 11b of the case 11 in the rear of the heater core 15 in spaced relation therewith, and a warm air path 18 is formed between the warm air guide wall 11d and the heater core 15. The warm air that has passed through the heater core 15 is guided by the warm air guide wall 11d and flows upward along the warm air path 18. An upper end curved portion 11e bent toward the vehicle front is formed above the warm air guide wall 11d.

The upper end curved portion 11e guides the warm air toward the vehicle front from the warm air path 18, and the warm air impinges on the cool air rising, as indicated by arrow b, along the cool air path 16 so that the cool air and the warm air are mixed with each other. As a result, an air mixing portion 19 in which the cool air and the warm air are mixed with each other is formed above the cool air path 16.

A defroster opening 20 is open to the upper surface portion of the case 11 near to the vehicle front, and a center face opening 21a and side face openings 21b, 21c are open to that portion of the defroster opening 20 included in the upper surface of the case 11 which is located near to the rear of the vehicle. The side face openings 21b, 21c are arranged on the left and right sides, respectively, of the center face opening 21a as shown in FIG. 7.

The flow path of the center face opening 21a and the flow paths of the left and right side face openings 21b, 21c are partitioned by left and right partitioning walls 11f (FIGS. 6 to 8) formed integrally with the upper division cases 11a, 11b of the case 11. FIGS. 1 to 3 show only the lower end portion of the partitioning walls 11f. The defroster opening 20 and the face openings 21a, 21b, 21c are all rectangular.

The defroster opening 20 is for blowing out the air-conditioning air from the air mixing portion 19 toward the inner surface of the windshield of the vehicle. The center face opening 21a, on the other hand, is for blowing out the air-conditioning air from the air mixing portion 19 toward the upper half body of the occupants at the central portion of the compartments. The side face openings 21b, 21c are for blowing out the air-conditioning air to the upper half body of the occupants or the inner surface of the side window glass of the vehicle at the left and right ends in the compartments.

Further, a foot opening 22 is arranged above the upper end curved portion 11e of the warm air guide wall 11d in the case 11. This foot opening 22 guides the air-conditioning air from the air mixing portion 19 through the foot air blowout path 23 to the left and right foot blowout ports 24a for the front seat and the foot air blowout port 24b for the rear seat.

The air-conditioning air from the left and right foot air blowout ports 24a for the front seat is blown out toward the feet of the front-seat occupants (driver and front passenger). The air-conditioning air from the foot air blowout port 24b for the rear seat, on the other hand, is blown out through a rear-seat foot air duct, not shown, toward the feet of the rear-seat occupants.

According to this embodiment, a blowout mode switching mechanism is configured of two rotary doors including first and second rotary doors 25, 26. The foot opening 22 is opened/closed by the first rotary door 25, and the defroster opening 20 and the center face opening 21a by the second rotary door 26.

A communication path 27 is formed adjacently to the portion of the foot opening 22 nearer the vehicle front. This communication path 27 is formed over the whole transverse area of the vehicle in the case 11. More specifically, the communication path 27 is defined into a central communication path 27a and left and right communication paths 27b, 27c by the partitioning walls 11f as shown in FIGS. 7, 8.

The flow paths of the defroster opening 20 and the center face opening 21a communicate with the air mixing portion 19 through the central communication path 27a. The flow paths of the left and right side face openings 21b, 21c, on the other hand, communicate with the air mixing portion 19 through the left and right communication paths 27b, 27c.

As described later, the central communication path 27a is opened/closed by the first rotary door 25, while the left and right communication paths 27b, 27c always communicate with the air mixing portion 19 regardless of the rotational position of the first rotary door 25.

Figure 4:
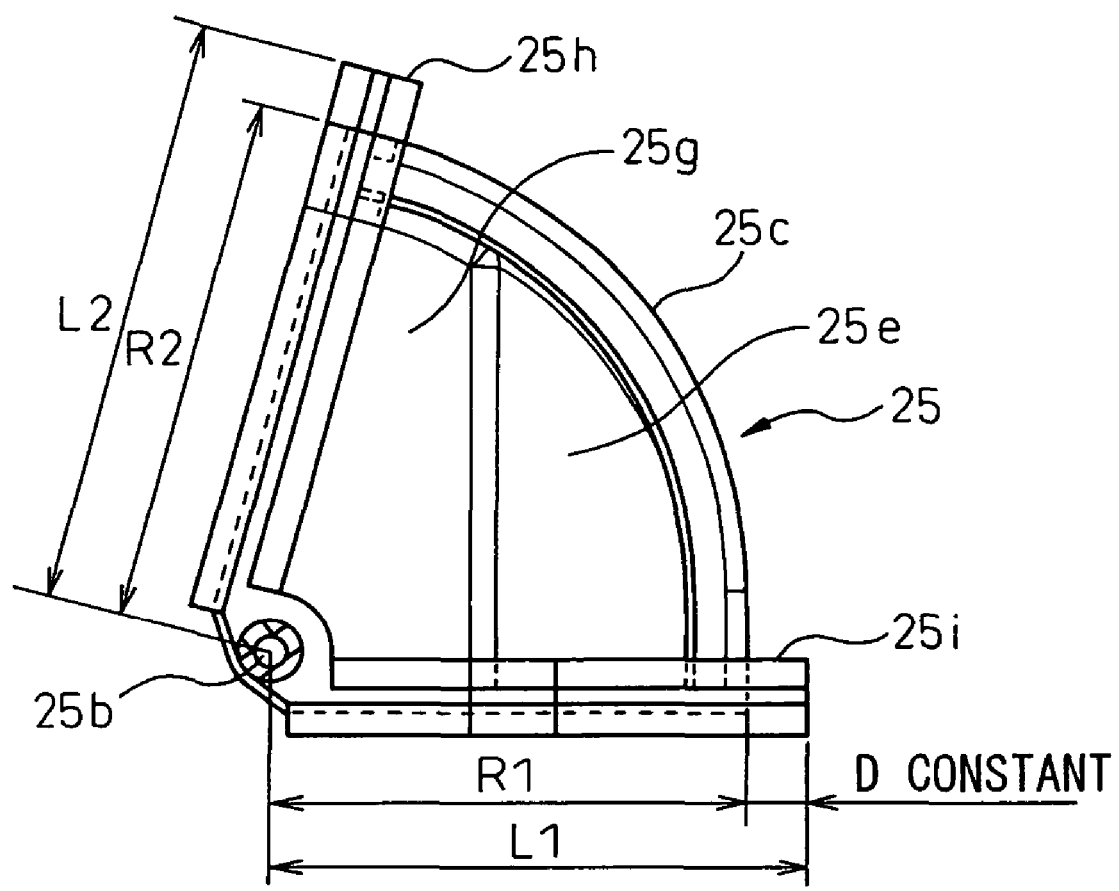
FIG. 4 is a side view of the first rotary door for foot applications according to the first embodiment.
Figure 5:
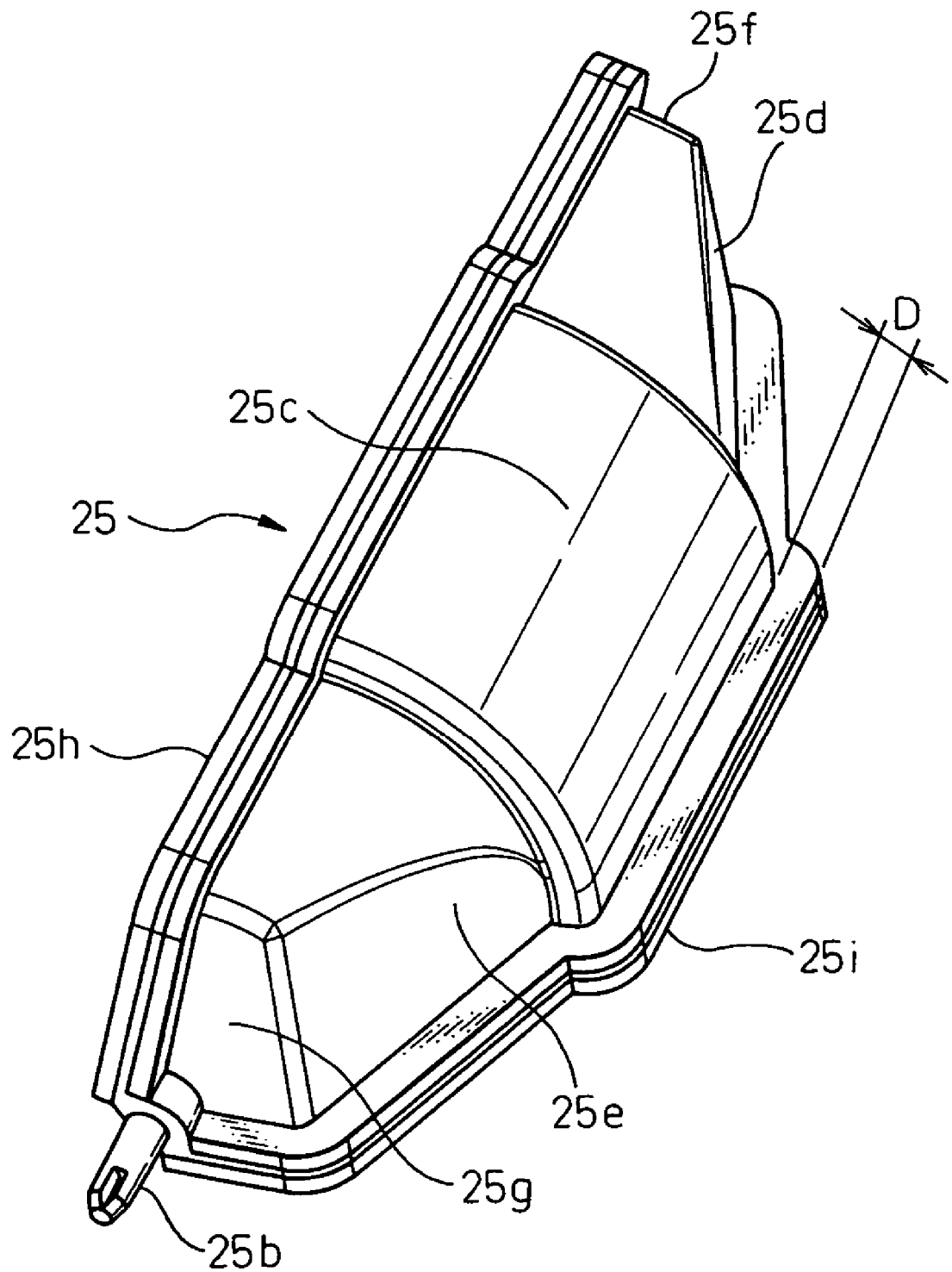
FIG. 5 is a perspective view of the first rotary door for foot applications according to the first embodiment.

Next, a specific configuration of the first rotary door 25 is explained with reference to FIGS. 4 to 8. FIG. 4 is a side view of the first rotary door 25 as a unit, and FIG. 5 a perspective view thereof. FIG. 6 is a sectional view taken in line A-A in FIG. 1, FIG. 7 a sectional view taken in line B-B in FIG. 1, and FIG. 8 a sectional view taken in line C-C in FIG. 3.

The first rotary door 25, as shown in FIG. 8, has rotary shafts 25a, 25b at the left and right ends thereof, and has the side surfaces enlarged in the shape of V diametrically outward around the left and right rotary shafts 25a, 25b (FIG. 4). The axial central portion of the first rotary door 25, i.e. the central portion located between the left and right partitioning walls 11f is formed with an arcuate central door surface 25c at a position a predetermined distance diametrically outward of the rotary shafts 25a, 25b.

The left and right door surfaces 25d, 25e are formed integrally on the left and right sides (two axial sides) of the central door surface 25c. The size of the left and right door surfaces 25d, 25e along the door diameter is smaller than the outer peripheral door surface 25. Also, most of each of the left and right door surfaces 25d, 25e form a slope progressively decreased in the size along the door diameter toward the left and right ends from the axial center of the door as shown in FIGS. 6, 7.

At the ends (side ends of the vehicle front) of the first rotary door 25 nearer to the defroster opening 20 in circumferential direction, as shown in FIG. 8, the left and right door surfaces 25d, 25e are formed in parallel to the axial direction of the door, and therefore the size of the left and right door surfaces 25d, 25e along the door diameter is constant. The left and right partitioning walls 11f, as shown in FIGS. 7, 8, are arranged in an opposed relation to the portions of the left and right door surfaces 25e, 25e nearer to the central door surface 25c.

The radius of the arc of the central door surface 25c of the first rotary door 25 is not constant but, as shown in FIG. 4, the radius R1 of the end portion of the central door surface 25c nearer to the foot opening 22 (the side end of the rear vehicle portion) is smaller than the radius R2 of the end portion of the central door surface 25c nearer to the defroster opening 20 (the side end of the vehicle front) (R<R2), and the radius of the arc of the central door surface 25c is progressively increased from the radius R1 to the radius R2.

The end portions of the left and right door surfaces 25d, 25e are coupled integrally with the rotary shafts 25a, 25b by the side surface walls 25f, 25g formed at right angles to the door axis.

The rotary shafts, 25a, 25b, the central door surface 25c, the left and right door surfaces 25d, 25e and the side surface walls 25f, 25g making up the first rotary door 25 are formed, integrally with each other, of resin. The rotary shafts 25a, 25b are rotatably supported in the bearing holes of the upper division cases 11a, 11b of the case 11.

The inner space of the first rotary door 25 is kept open to the space in the case 11 and, therefore, the air can freely flow in the inner space of the first rotary door 25 (arrows c, d in FIGS. 1, 2).

Seal units 25h, 25i of an elastic material are fixed at the circumferential ends of the central door surface 25c, the left and right door surfaces 25d, 25e and the side surface walls 25f, 25g of the first rotary door 25. The two seal units 25h, 25i located at the circumferential ends of the door, as shown in FIG. 4, formed in the shape of V spreading from the location of the rotary shafts 25a, 25b.

Also, the seal units 25h, 25i are formed of a specific material such as a thermoplastic elastomer having an elasticity like rubber at normal temperature and which, like a thermoplastic resin, can be melted into fluid and can be subjected to injection molding at a high temperature. Thus, the seal units 25h, 25i can be fixed on the door surface by integral molding at the time of forming the first rotary door.

The seal units 25h, 25i are projected like lips outward from the door surface of the first rotary door 25 and make up a lip seal structure. The projection height D of the seal units 25h, 25i from the door surface, as shown in FIGS. 6, 8, is constant over the whole area of the seal units.

Thus, in FIG. 4, the maximum size along the door diameter including the projection height D of the seal units 25h, 25i, the maximum size L1, along the door diameter, of the end portion nearer to the foot opening 22 (the end nearer to the vehicle rear portion) is smaller than the maximum size L2, along the door diameter, of the end portion (the end nearer to the vehicle front) nearer to the defroster opening 20 (L1<L2), where L1=R1+D and L2=R2+D. In the example shown in FIG. 4, L1 and R2 are substantially the same in size.

In FIG. 6, on the other hand, a seal rib 28 is integrally molded with the upper division cases 11a, 11b of the case 11 and forms a case-side seal surface formed at the opening edge of the foot opening 22. The central end surface 28a of the seal rib 28 along the door axis (transverse direction of the vehicle) is recessed from the left and right end surfaces 28b, 28c, i.e. the seal rib 28 is formed as a depression diametrically outward from the central door surface 25c. In FIG. 6, the foot opening 22 is formed of the opening area under the left and right end surfaces 28b, 28c and the central end surface 28a of the seal rib 28.

As shown in FIG. 6, if K1 is the interval between the center line P of each of the door rotary shafts 25a, 25b and the central end surface 28a of the seal rib 28, the maximum size L1, along the door diameter, of the end portion (the end nearer to the vehicle rear portion) of the first rotary door 25 nearer to the foot opening 22 is set a predetermined amount smaller than the interval K1 (L1<K1). As a result, a predetermined gap T is formed between the central end surface 28a of the seal rib 28 and the door seal unit 25i in heater mode (FIG. 1).

The maximum size L2, along the door diameter, of the end portion (the end nearer to the vehicle front) of the defroster opening 20 of the first rotary door 25, on the other hand, is set a predetermined amount larger than the interval K1 as shown in FIG. 8 (L2>K1).

Also, if K2 is the interval between the center line P of the door rotary shafts 25a, 25b and each of the left and right end surfaces 28b, 28c of the seal rib 28, and H (FIG. 8) is the size, along the diameter including the projection height D, of the seal unit 25h on the left and right door surfaces 25d, 25e located at the end of the first rotary door 25 nearer to the defroster opening 20 then the diametrical size H is set a predetermined amount larger than the interval K2 (H>K2).

Thus, the seal unit 25h of the first rotary door 25 located at the end of the defroster opening 20, as shown in FIG. 8, is closely attached over the whole end surface (including the end surfaces 28a to 28c) of the seal rib 28. As a result, the foot opening 22 can be closed up by the first rotary door 25.

Next, the second rotary door 26 will be explained. The second rotary door 26 is rotated around the rotary shafts 26a, 26b thereby to open/close the defroster opening 20 and the center face opening 21a as described above. As shown in FIG. 7, the center face opening 21a is arranged between the left and right partitioning walls 11f of the case 11. The inlet flow path (lower flow path) of the defroster opening 20, though not shown in FIG. 7, is also arranged, like the center face opening 21a, between the left and right partitioning walls 11f.

In the second rotary door 26, the door surface 26c corresponding to the central door surface 25c of the first rotary door 25 is arranged between the left and right partitioning walls 11f as shown in FIG. 7. The door surface 26c has a simple arcuate form having a fixed radius around the rotary shafts 26a, 26b. The axial ends of the door surface 26c are coupled to the rotary shafts 26a, 26b through the side surface walls 26d, 26e formed sectorially.

The rotary shafts 26a, 26b, the door surface 26c and the side surface walls 26d, 26e making up the second rotary door 26 are integrally molded of resin. The seal units 26f, 26g (FIGS. 1 to 3) corresponding to the seal units 25h, 25i of the first rotary door 25 are integrally fixed on the second rotary door 26.

The rotary shafts 26a, 26b of the second rotary door 26, as shown in FIG. 7, are projected out of the left and right side surface walls of the case 11 through the partitioning walls 11f and the flow paths of the left and right side face openings 21b, 21c.

A gap to allow the first rotary door 25 to rotate is always formed between the outer periphery of each of the door surfaces 25c, 25d, 25e of the first rotary door 25 and the lower ends of the partitioning walls 11f. These gaps permit the central communication path 27a and each of the left and right communication paths 27b, 27c to communicate with each other. According to this embodiment, as shown in FIGS. 7, 8, a stepped labyrinth structure 30 is formed between the central communication path 27a and each of the left and right communication paths 27b, 27c thereby to suppress the air flow between the communication path 27a and each of the communication paths 27b, 27c.

The stepped labyrinth structure 30 is formed in the specific manner described below. Specifically, as shown in FIG. 7, the radius F of each of the left and right door surfaces 25d, 25e is set smaller than the radius E of the central door surface 25c of the first rotary door 25 thereby to form a stepped portion in the boundary between the central door surface 25c and each of the left and right door surfaces 25d, 25e.

As a result, the stepped portion in the boundary between the door surfaces of the first rotary door 25 is combined with the lower end portions of the partitioning walls 11f to make up the labyrinth structure 30 having a gap as a stepwise bent path in the foot mode.

The lower end portions of the partitioning walls 11f, as shown in FIGS. 1 to 3, are located nearer to the outer periphery than to the central door surface 25c of the first rotary door 25, and have an arcuate form along the central door surface 25c. The lower end portions of the partitioning walls 11f are so shaped as to secure the required minimum gap between each of the lower end portions of the partitioning walls 11f and each of the left and right door surfaces 25d, 25e of the first rotary door 25 in such a manner as to not hamper the rotation of the first rotary door 25.

The shape of the partitioning walls 11f is such that once the first rotary door 25 is driven to the position where the foot opening 22 is closed up as shown in FIGS. 3, 8, the lower end portions (the end portion nearer to the first rotary door 25) of the partitioning walls 11*f* are at a lower position (position inward along the door diameter) than the forward end of the portion (the portion corresponding to the seal unit 25*h*) having the maximum size L2, along the door diameter, of the end portion of the first rotary door 25 nearer to the defroster opening 20. By forming the partitioning walls 11*f* in this way, the lower end portions of the partitioning walls 11*f* can be located closest to the door surfaces 25*c*, 25*d*, 25*e* of the first rotary door 25.

The first and second rotary doors 25, 26 are operatively interlocked with each other through a common blowout mode door operation mechanism (not shown). Specifically, one of the left and right rotary shafts 25*a* of the first rotary door 25 and one of the left and right rotary shafts 26*a*, 26*b* of the second rotary door 26 are coupled to a common blowout mode door operation mechanism through a link mechanism (not shown) outside the left and right side walls of the case 11. Although an actuator mechanism with a motor is normally used as the blowout mode door operation mechanism, a manual operation mechanism may be used instead of the actuator mechanism.

Next, the operation of the first embodiment having the aforementioned configuration is explained. FIG. 1 shows the operation in foot mode, in which the first rotary door 25 is rotated to the position where the door surface 25*c* is located in a foremost point, and the whole of the seal unit 25*h* (the channel-shaped portion shown in FIG. 8) of the first rotary door 25 nearer to the defroster opening 20 (nearer to the vehicle front) is pressed against the seal surface 11*g* (FIGS. 1 to 3) of the inner wall of the case 11.

In the process, the seal unit 25*i* of the first rotary door 25 nearer to the foot opening 22 (nearer to the vehicle rear) also tends to be pressed against the seal rib 28. In view of the fact that the end surface 28*a* of the seal rib 28 located at the axially (transversely of the vehicle) central portion of the first rotary door 25 is formed as a depression coming away diametrically outward from the central door surface 25*c* of the first rotary door 25 and a predetermined gap T (FIGS. 1, 5) is formed between the central end surface 28*a* of the seal rib 28 and the door seal unit 25*i* on the central door surface 25*c*, however, this gap T permits the flow path of the foot opening 22 to communicate with the central communication path 27*a* as indicated by arrow c in FIG. 1.

At the same time, a gap M shown in FIG. 6 is formed between each of the left and right end surfaces 28*b*, 28*c* of the-seal rib 28 and the door seal unit 25*i* on the left and right door surfaces 25*d*, 25*e* of the first rotary door 25. This gap M establishes a communication from the flow path of the foot opening 22 to each of the left and right side face openings 21*b*, 21*c* through the left and right communication paths 27*b*, 27*c* (FIGS. 7, 8).

The second rotary door 26, on the other hand, is rotated to the position where the door surface 25*c* is located in a rearmost point, and closes up the center face opening 21*a* while at the same time fully opening the defroster opening 20.

The foot mode is used mainly for blowing out the warm air to the feet of the occupants during the heating operation. The air mix door 14, therefore, is operated to the maximum heating position where the inlet air path 17 of the heater core 15 is fully opened and the cool air path 16 is closed up, or the intermediate temperature control position where the cool air path 16 is slightly opened while the opening degree of the inlet air path 17 of the heater core 15 is reduced from the full open position. FIG. 1 shows the state in which the air mix door 17 is operated to the intermediate temperature control position.

Most of the cool air that has passed through the evaporator 13 flows into the core unit 15*a* of the heater core 15 from the inlet air path 17 as indicated by arrow a, and is heated to be warm air. This warm air passes through the warm air path 18 and flows toward the air mixing portion 19. Part of the cool air that has passed through the evaporator 13 flows toward the air mixing portion 19 as a cool air through the cool air path 16 as indicated by arrow b in FIG. 1.

The cool air and the warm air are mixed with each other in the area in the neighborhood of the air mixing portion 19, so that the warm air is adjusted to the desired temperature. Most of the warm air at the desired temperature is passed through the inner space of the first rotary door 25, the foot opening 22 and the foot blowout path 23 as indicated by arrow d in FIG. 1 and blown out toward the feet of the occupants in the front seat from the left and right foot air outlets 24*a* near the front seat. At the same time, part of the warm air in the foot blowout path 23 is blown out toward the feet of the occupants in the rear seat through the rear-seat foot air duct, not shown, from the rear-seat foot air outlet 24*b*.

Part of the warm air that has reached the foot opening 22 through the inner space of the first rotary door 25, on the other hand, passes through the gap T formed on the outer periphery of the door seal unit 25*i* on the central door surface 25*c* of the first rotary door 25 as indicated by arrow c in FIG. 1, and flows into the central communication path 27*a*.

In the operation in foot mode, the central communication path 27*a* communicates with the defroster opening 20 through the second rotary door 26, and therefore, part of the warm air is blown out toward the inner surface of the vehicle windshield through the defroster opening 20 from the central communication path 27*a*. As a result, the vehicle windshield is defrosted.

Further, part of the warm air that has reached the foot opening 22 flows into the left and right communication paths 27*b*, 27*c* through the gap M (FIG. 6) formed on the outer periphery of the door seal 25*i* on the left and right door surfaces 25*d*, 25*e* of the first rotary door 25. The left and right communication paths 27*b*, 27*c* communicate all the time with the left and right side face openings 21*b*, 21*c*, and therefore, part of the warm air, after passing through the left and right side face openings 21*b*, 21*c*, is blown out to the upper half body of the occupants or the inner surface of the vehicle side window glass from the side face air outlets (not shown) located at the left and right ends of the vehicle instrument panel. As a result, the cold feeling in the neighborhood of the shoulders of the occupants attributable to the low temperature of the vehicle side window glass is obviated or the vehicle side window glass are defrosted.

In this embodiment, it should first be noted that a predetermined gap T is formed in foot mode operation between the central end surface 28*a* of the seal rib 28 nearer to the case 11 making up the opening edge of the foot opening 22 and the door seal unit 25*i* on the central door surface 25*c* of the first rotary door 25, and part of the warm air that has reached the foot opening 22 flows into the defroster opening 20 through the gap T.

The link mechanism, etc. coupled to the first rotary door 25 has some play. Due to the air pressure at the foot mode position shown in FIG. 1, therefore, the first rotary door 25 is rotated within the range of the play of the link mechanism, etc. and the stop position of the first rotary door 25 changes.

According to this embodiment, however, the gap T is formed not in the direction of rotation (circumferential direction) of the first rotary door 25 but on the diametrical outside of the central door surface 25*c* of the first rotary door 25. Even in the case where the first rotary door 25 is rotated to some degree by air pressure, therefore, the size of the gap T substantially remains unchanged. During the foot mode operation, therefore, the defroster blowout air amount from the defroster opening 20 and the foot blowout air amount from the foot opening 22 can be accurately maintained in a proper preset proportion.

In addition, as the gap T is formed on the diametrical outside of the central door surface 25*c* of the first rotary door 25, part of the warm air that has reached the foot opening 22 can flow into the defroster opening 20 through the gap T. Thus, the warm air fully mixed with the cool air can flow into both the defroster opening 20 and the foot opening 22.

As a result, unlike in the prior art, a phenomenon is not caused in which the cool air after passing through the evaporator 13 directly flows into the flow path nearer to the defroster opening 20 from the cool air path 16. As a result, the defroster blowout temperature is prevented from being reduced excessively in foot mode operation, thereby making it possible to set a proper vertical blowout temperature difference between the defroster blowout temperature and the foot blowout temperature. Thus, the vehicle windshield can be defrosted while at the same time heating the feet of the occupants comfortably.

A second point to be noted is a labyrinth structure 30 in which the air flow is suppressed between each of the left and right communication paths 27*b*, 27*c* communicating with the left and right side face openings 21*b*, 21*c* on the one hand and the central communication path 27*a* communicating with the defroster opening 20 on the other hand, during the foot mode operation. The technical significance of this labyrinth structure is explained below.

The outlets of the left and right side face openings 21*b*, 21*c* are connected to the side face air outlets (not shown) arranged at the left and right ends of the instrument panel. A grille open/close mechanism normally manually operated is arranged at each of the side face air outlets, whereby the air blowout from the side face air outlets can be interrupted.

Once the grille open/close mechanism of the side face air outlets is opened, the proportion between the side face blowout air amount from the side face air outlets and the defroster blowout air amount from the defroster opening 20 can be basically determined by the profile of the door surfaces 25*c*, 25*d*, 25*e* of the first rotary door 25. Specifically, the size of the central gap T near to the defroster opening 20 and the size of the left and right gaps M near to the side face openings 21*b*, 21*c* can be determined by the profile of the door surfaces 25*c*, 25*d*, 25*e* of the first rotary door 25.

In the case where the amount of air flowing between the central communication path 27*a* near to the defroster opening 20 and each of the left and right communication paths 27*b*, 27*c* near to the side face openings 21*b*, 21*c* is large, however, the proportion between the side face blowout air amount and the defroster blowout air amount due to the profile of the door surfaces 25*c*, 25*d*, 25*e* of the first rotary door 25 is changed out of the preset proper value.

According to this embodiment, therefore, the labyrinth structure 30 is formed by a combination of the stepped portion in the boundary between each of the door surfaces 25*c*, 25*d*, 25*e* of the first rotary door 25 and the lower end portion of the case-side partitioning wall 11*f* at the foot mode position of the first rotary door 25.

In this labyrinth structure 30, a stepwise bent gap path is formed to increase the air flow resistance in the gap path.

Thus, the air flow between the central communication path 27*a* and each of the left and right communication paths 27*b*, 27*c* can be suppressed.

Further, according to this embodiment, as shown in FIG. 8, the partitioning walls 11*f* are so shaped that when the first rotary door 25 is operated to the position where the foot opening 22 is closed up, the lower end portion of the partitioning walls 11*f* is located at a lower position (inner position along the direction of the door diameter) than the forward end of the end portion, having the maximum size L2 along the door diameter, of the first rotary door 25 nearer to the defroster opening 20.

As a result, upon rotation of the first rotary door 25, the required minimum gap is secured between the lower end portion of the partitioning walls 11*f* and each of the left and right door surfaces 25*d*, 25*e* of the first rotary door 25. In this way, the smooth rotation of the first rotary door 25 is guaranteed while, at the same time, making it possible to locate the lower end portion of the partitioning walls 11*f* as near to the door surfaces 25*c*, 25*d*, 25*e* of the first rotary door 25 as possible. Thus, the suppression of air flow by the labyrinth can be further enhanced.

In FIG. 8, the larger the difference (=L2−H) between the maximum size L2, along the door diameter, of the end portion of the first rotary door 25 near to the defroster opening 20 and the size H along the door diameter at the positions of the left and right door surfaces 25*d*, 25*e*, the larger the stepped portion of the labyrinth structure 30, thereby further enhancing the suppression of the air flow.

Now, the foot defroster mode shown in FIG. 2 is explained. In the foot defroster mode operation, the first rotary door 25 is rotated towards the position where the door surface 25*c* is located in a rearmost point by a predetermined angle from the foremost position shown in FIG. 1, and moved to the intermediate position between the foremost position shown in FIG. 1 and the rearmost position shown in FIG. 3. As a result, the seal unit 25*h* of the first rotary door 25 is separated from the seal surface 11*g* of the case 11, while the other seal unit 25*i* is also separated from the seal rib 28 of the case 11.

In the process, the second rotary door 26 is maintained at the same position where the door surface 26*c* is located in a rearmost point as in the foot mode operation, and therefore the center face opening 21*a* is closed up while at the same time fully opening the defroster opening 20.

The first rotary door 25 moves to the intermediate position between FIGS. 1 and 3, so that an air flow (arrows e, f) is formed directly toward the central communication path 27*a* from the air mixing unit 19 and the air indicated by the arrows e, f flows into the defroster opening 20.

Also, with the movement of the first rotary door 25 to the intermediate position between FIGS. 1 and 3, the central end surface 28*a* of the seal rib 28 comes to be located in opposed relation to the intermediate circumferential portion of the central door surface 25*c* of the first rotary door 25. As a result, a gap T' is formed between the central end surface 28*a* of the seal rib 28 and the central door surface 25*c*. This gap T' is larger than the gap T shown in FIG. 1 (T'>T), and permits part of the warm air in the foot opening 22 to flow into the defroster opening 20 through the central communication path 27*a* as indicated by arrow c in FIG. 2.

In the foot defroster mode operation, therefore, an air flow directly toward the defroster opening 20 from the air mixing unit 19 and an air flow toward the defroster opening 20 through the gap T' from the foot opening 22 as shown by arrows e, f in FIG. 2 are formed. In the foot defroster mode operation, therefore, unlike in the foot mode operation, the defroster blowout air amount can be increased and the vehicle windshield can be defrosted more effectively than in the foot mode operation.

Most of the warm air that has reached the foot opening 22, on the other hand, after passing through the foot air blowout path 23, is blown out toward the feet of the occupants from the front-seat left and right foot air outlets and the rear-seat foot air outlet 24b and thus heats the compartments.

Also, in the foot/defroster mode, air (warm air) can flow into the side face openings 21b, 21c. Specifically, part of the warm air in the foot opening 22 is rendered to flow into the left and right communication paths 27b, 27c through the gap M shown in FIG. 6, while part of the air (warm air) in the air mixing portion 19 flows directly into the left and right communication paths 27b, 27c. Then, the air can flow into the left and right side face openings 21b, 21c from the left and right communication paths 27b, 27c.

The air (warm air) that has flowed into the side face openings 21b, 21c is blown out to the inner surface of the vehicle side window glass or the upper half of the body of each occupant near to the window glass from the side face air outlets (not shown) arranged at the left and right end portions of the instrument panel. Thus, the vehicle side window glass are defrosted or, as the case may be, the upper half body of the occupants near to the window glass is effectively heated.

In the foot/defroster mode operation, the direct air flow toward the defroster opening 20 from the air mixing portion 19 is formed as indicated by arrows e, f in FIG. 2. Therefore, the cool air that has passed through the cool air path 16 flows more easily toward the defroster opening 20 as indicated by arrow e, and the defroster blowout air temperature may excessively decrease to below the foot blowout air temperature.

According to this embodiment, however, an air flow is formed directed from the flow path of the foot opening 22 toward the defroster opening 20 through the gap T' and, therefore, the air mainly composed of high temperature warm air that has flowed into the foot opening 22 can be made to flow into the defroster opening 20 through the gap T'.

In other words, the air flow from the flow path of the foot opening 22 toward the defroster opening 20 through the gap T' forms a warm air bypass flow to the defroster opening 20. As a result, an excessive reduction in the defroster blowout air temperature, to below the foot blowout air temperature, can be suppressed, and a proper vertical blowout air temperature difference can be set also in the foot/defroster mode operation.

Next, FIG. 3 shows the defroster mode operation of all the blowout mode operations for closing up the foot opening 22. In the defroster mode operation, the first rotary door 25 is rotated further toward the rear of the vehicle by a predetermined angle beyond the intermediate position shown in FIG. 2, and thus moves to the rearmost position where the first rotary door 25 is located in a rearmost point. At the rearmost position, the front seal unit 25h of the first rotary door 25 can be attached closely over the whole area of the end surfaces 28a to 28c of the seal rib 28 as shown in FIGS. 3, 8. At the same time, the rear seal unit 25i of the first rotary door 25 can be attached closely on the upper surface portion (case-side seal surface) of the upper end bent portion 11e of the warm air guide wall 11d as shown in FIG. 3.

As a result, the foot opening 22 is closed up by the first rotary door 25 and, therefore, the air flow from the air mixing portion 19 toward the foot opening 22 is shut off. The second rotary door 26, on the other hand, is maintained in the same position as in the foot mode operation or the foot/defroster mode operation, so that the center face opening 21a is closed up while the defroster opening 20 is opened full.

Most of the air (warm air) in the air mixing portion 19, therefore, flows into the defroster opening 20 from the central communication path 27a and is blown out to the vehicle windshield. As a result, the defroster blowout air amount can be increased to a maximum and the windshield can be defrosted most effectively.

Also, in the defroster mode operation, part of the air (warm air) in the air mixing portion 19 flows into the left and right side face openings 21b, 21c through the left and right communication paths 27b, 27c. Therefore, the warm air is blown out to the inner surface of the vehicle side window glass or the upper half body of the occupants near to the window glass from the side face air outlets (not shown) arranged at the left and right end portions of the instrument panel, thereby effectively defrosting the vehicle side window glass or, as the case may be, heating the upper half body of the occupants near to the window glass.

Next, in FIG. 3, if the second rotary door 26 is rotated toward the vehicle front, the defroster opening 20 is closed up by the second rotary door 26, and the center face opening 21a can be opened full. Thus, only the center face opening 21a and the left and right side face openings 21b, 21c are opened, so that the air (warm air) in the air mixing portion 19 flows only into the center face opening 21a and the left and right side face openings 21b, 21c. As a result, the face mode operation can be set.

Also, upon rotation of the second rotary door 26 toward the vehicle front in FIG. 2, the defroster opening 20 is closed up by the second rotary door 26, while the center face opening 21a can be opened full. Thus, the center face opening 21a and the left and right side face openings 21b, 21c are opened, while at the same time opening the foot opening 22. As a result, the bilevel mode can be set in which the air-conditioning air is blown out toward the upper half body and the feet of the occupants at the same time.

In the rotary doors 25, 26, the door surfaces 25c to 25e, 26c are rotated integrally with the rotary shafts 25a, 25b, 26a, 26b in the direction across or along the air flow and, therefore, a door operation directed against the air flow pressure is not required. The resultant advantage is that the operating force of the rotary doors 25, 26 can be reduced as compared with the cantilever door which is operated directly against the air flow pressure.

If each blowout opening is opened/closed using a butterfly door with the rotary shaft arranged at the central portion of the door plate surface, upon operation of the butterfly door to the open position of each opening, the flow path of each blowout opening is separated by the plate surface of the butterfly door. Thus, the cool and warm air flows are separated from each other and variations in the blowout air temperature increase. With the rotary doors 25, 26, on the other hand, the flow paths of the blowout openings are not partitioned and, therefore, the variation of the blowout air temperature can be advantageously reduced as compared with the butterfly door.

Second Embodiment

Figure 9:
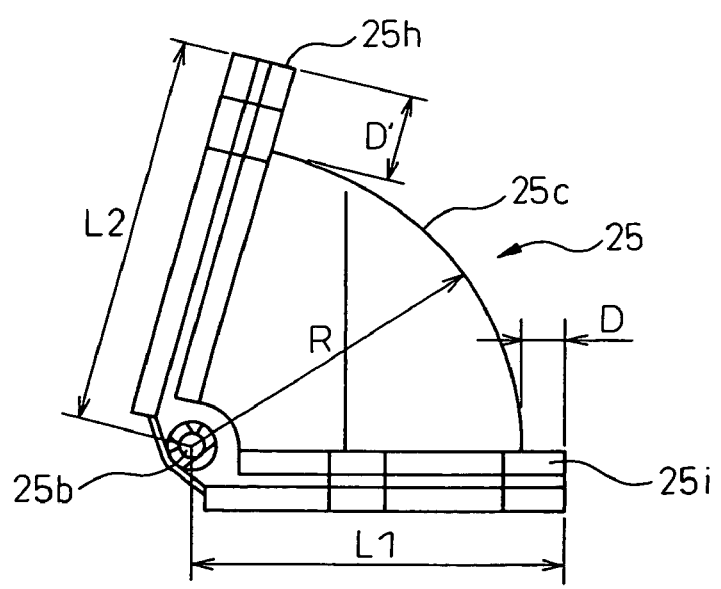
FIG. 9 is a side view of the first rotary door for foot application according to a second embodiment.

FIG. 9 shows the first rotary door 25 for the foot application according to a second embodiment. According to the second embodiment, the radius R of the central door surface 25c of the first rotary door 25 is kept constant over the whole circumferential area. Of the two seal units 25h, 25i of the first rotary door 25, therefore, the projection height D' of the seal unit 25h of the end near to the defroster opening 20 is set larger than the projection height D of the seal unit 25i of the end near to the foot opening 22 (D'>D).

As a result, the maximum size L1, along the door diameter, of the end portion (end portion near to the vehicle rear end) near to the foot opening 22 is smaller than the maximum size L2, along the door diameter, of the end portion (end portion near to the vehicle front) of the defroster opening 20 (L1<L2), where L1=R+D, L2=R+D'.

Also in the second embodiment, the gap T shown in FIGS. 1, 6 can be formed and can be closed in defroster mode, by setting the relation L1<L2 described above. The gap T can be maintained at substantially the same size regardless of some rotation of the first rotary door 25 which may be caused by the air pressure. During the foot mode operation, therefore, the proper proportion can be maintained between the defroster blowout air amount and the foot blowout air amount.

The disadvantage of the second embodiment, however, is that, because the projection height D' of the seal unit 25h is larger than the projection height D of the other seal unit 25i, the air pressure imposed on the seal unit 25h is increased beyond the operating force of the first rotary door 25 in the first embodiment.

Other Embodiments

This invention is not limited to the embodiments described above, but can be modified variously as described below.

(1) According to the embodiments described above, the foot blowout mode door and the face/defroster switch mode door are both configured of a rotary door 25, 26 having the door surfaces 25c to 25e, 26c rotated at a position a predetermined diametrical distance away from the rotary shafts 25a, 25b, 26a, 26b. The face/defroster switch mode door, however, may be configured of a plate door instead of the rotary door 26.

The plate door may be, specifically, a cantilever door with the rotary shaft arranged at the end of a tabular door surface or a butterfly door with the rotary shaft arranged at the central portion of the tabular door surface.

Figure 10:
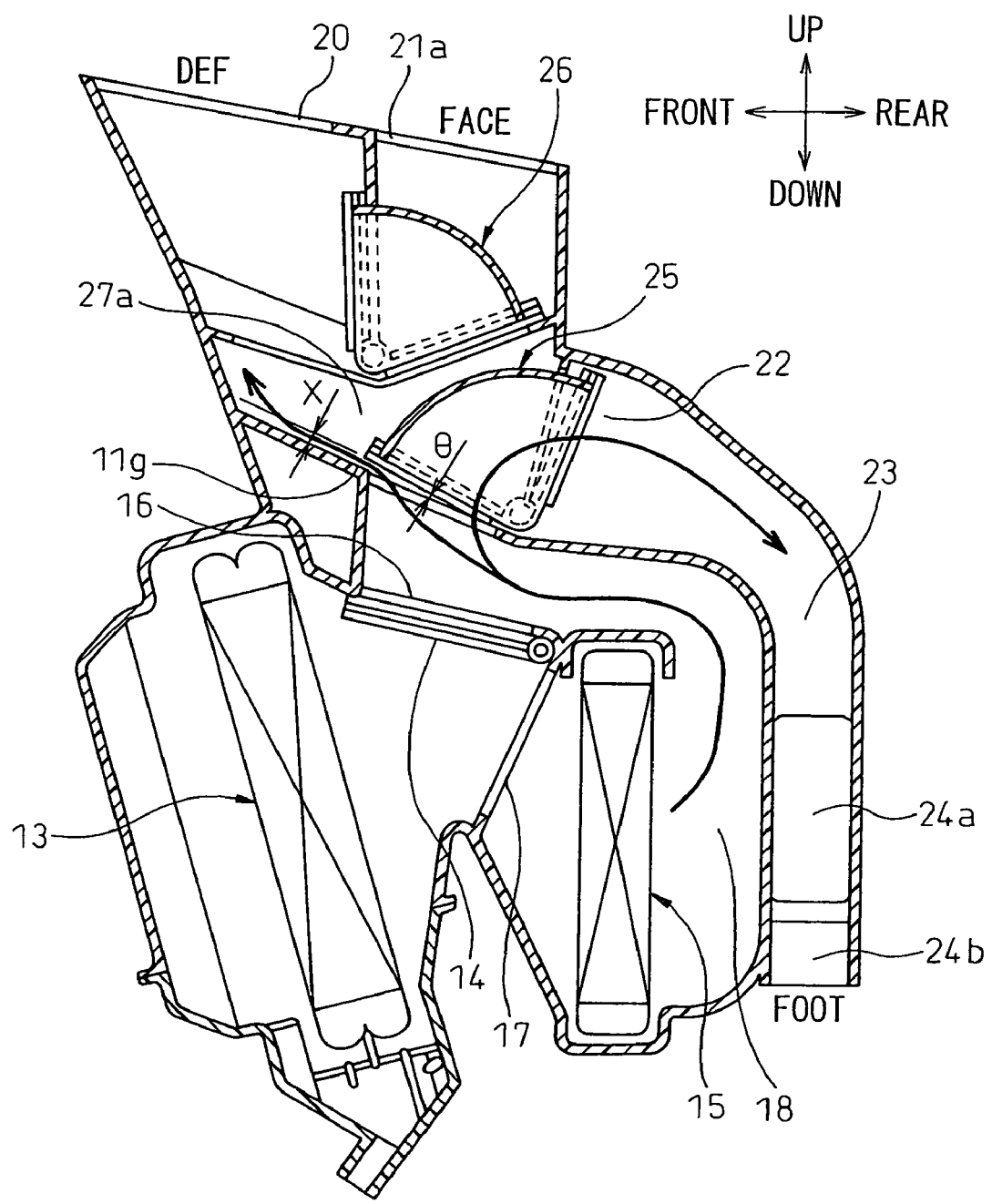
FIG. 10 is a sectional view of the foot mode showing the maximum heating state according to the prior art.
Figure 11:
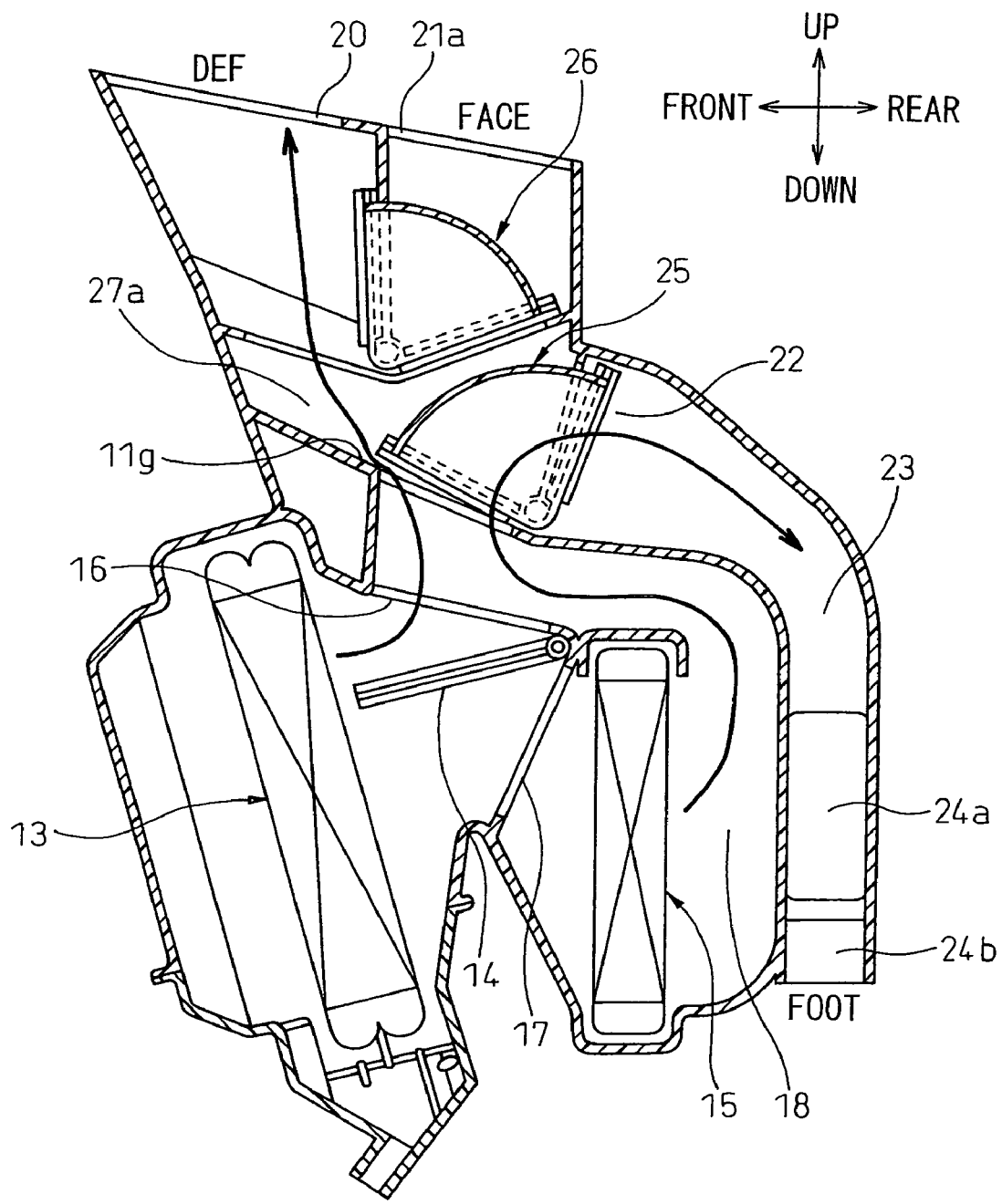
FIG. 11 is a sectional view of the foot mode showing the intermediate temperature control state according to the prior art.
Figure 12:
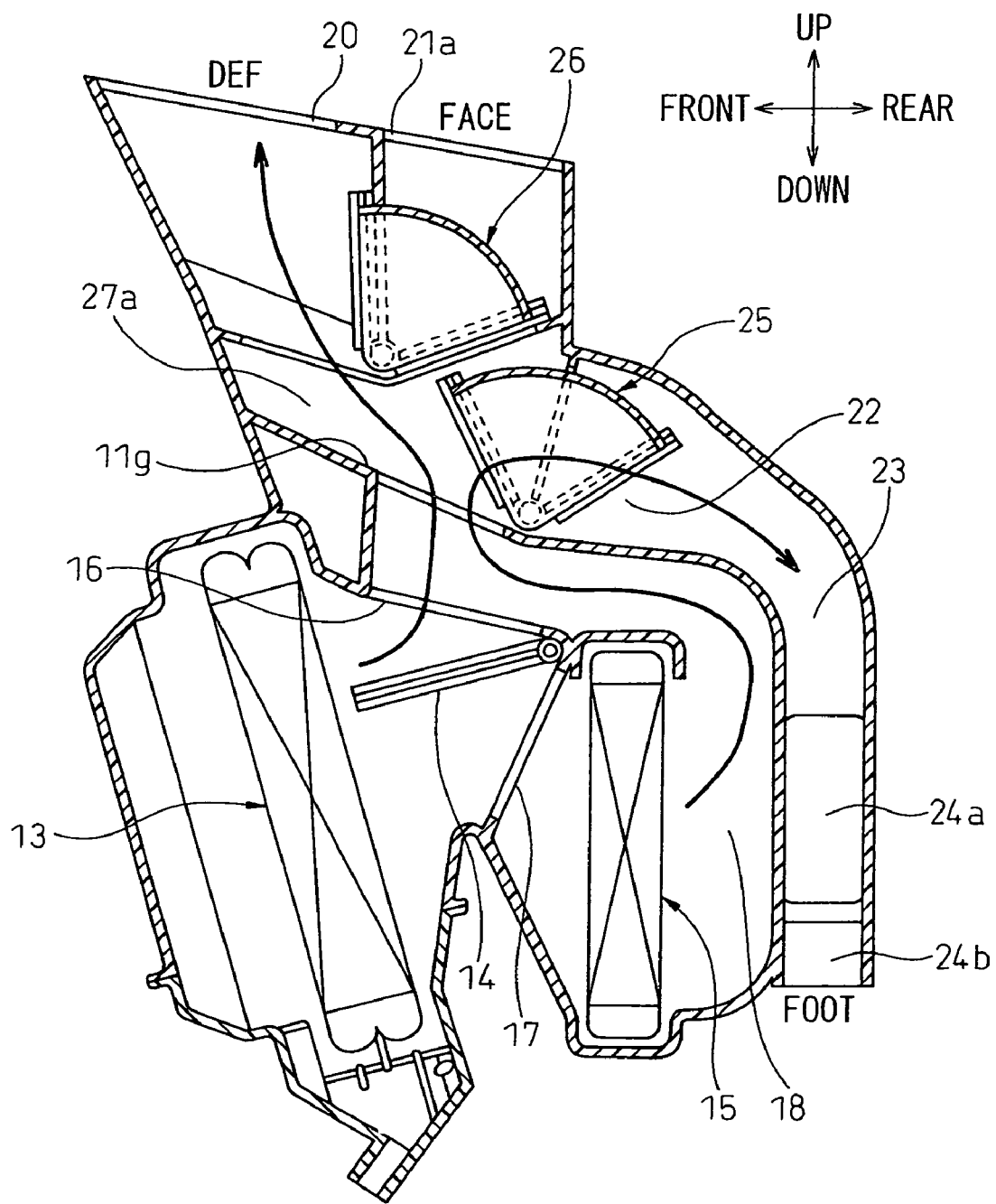
FIG. 12 is a sectional view showing the foot/defroster mode according to the prior art.

(2) According to the embodiments described above, the foot opening 22 is opened/closed by the first rotary door 25 for foot application, while the defroster opening 20 and the center face opening 21a are opened/closed by the second rotary door 26 for switching the face and the defroster. As shown in FIGS. 10, 11 of Japanese Unexamined Patent Publication No. 2004-155263, the center face opening 21a may be arranged upstream of the foot opening 22 and the defroster opening 20, the communication paths to the center face opening 21a, the foot opening 22 and the defroster opening 20 may be opened/closed by the second rotary door 26, and the foot opening 22 and the defroster opening 20 may be opened/closed by the first rotary door 25. In this configuration, the gap T according to the invention may be formed diametrically outward of the door surface of the first rotary door 25 in the foot mode.

(3) According to the embodiments described above, the evaporator 13 and the heater core 15 are arranged vertically so that the air inflow and outflow surfaces of the core units 13a, 15a of the heater core 15 and the evaporator 13 may extend in substantially vertical direction. Nevertheless, this invention can be embodied in a configuration in which the evaporator 13 and the heater core 15 are arranged horizontally so that the air inflow and outflow surfaces of the core units 13a, 15a of the evaporator 13 and the heater core 15 may extend in substantially horizontal direction.

(4) According to the embodiments described above, the door surfaces 25c, 26c of the first and second rotary doors 26 are formed in the shape of an arc. As an alternative, the door surfaces 25c, 26c may be flat.

While the invention has been described by reference to specific embodiments chosen for purposes of illustration, it should be apparent that numerous modifications could be made thereto, by those skilled in the art, without departing from the basic concept and scope of the invention.

What is claimed is:

1. An automotive air conditioning system comprising:
a case forming an air path in which air flows in a direction toward the interior of compartments;
a heating heat exchanger arranged in the case for heating the air;
a defroster opening and a foot opening arranged downstream of the heating heat exchanger in the air flow in the case; and
a blowout mode switching rotary door for opening/closing the defroster opening and the foot opening; wherein
the rotary door includes rotary shafts and a door surface adapted to rotate integrally with each of the rotary shafts at a position diametrically outward from the center of each rotary shaft,
the case is formed with a seal rib forming an opening edge portion of the foot opening,
upon rotation of the rotary door to a foot mode position which opens the foot opening, a gap is formed between a first circumferential end of the door surface and the seal rib, and the foot opening communicates with the defroster opening through the gap,
upon rotation of the rotary door to a defroster mode position which opens the defroster opening, a second circumferential end portion of the door surface comes into contact with the seal rib and closes the gap so that the door surface closes the foot opening,
the case includes a face opening downstream of the heating heat exchanger in the direction of the air flow,
the rotary door is configured to open/close a path between the foot opening and a communication path communicating with the defroster opening and the face opening,
the defroster opening and the face opening can be opened/closed by a door other than the rotary door,
the face opening has a center face opening and a side face opening arranged on each of left and right sides of the center face opening,
a profile of the rotary door is so shaped that communication paths communicating with the side face openings always communicate with a downstream side of the heating heat exchanger in the direction of the air flow at all rotational positions of the rotary door,
a communication path of the defroster opening and the center face opening is arranged as a first communication path at a central portion in the case,
the communication paths communicating with the side face openings are arranged as second communication paths on left and right sides of the first communication path in the case,
partitioning walls for defining the first communication path and the second communication paths are arranged on the left and right sides of the first communication path in the case,
the door surface of the rotary door constitutes a central door surface located between left and right partitioning walls, and the rotary door is formed with left and right door surfaces located on left and right sides, respectively, of the central door surface,
the size of the left and right door surfaces is smaller than that of the central door surface, so that the boundary between the central door surface and the left and right door surfaces is stepped, and the stepped boundary and end surfaces of the left and right partitioning walls combine to form a labyrinth structure.

2. An automotive air conditioning system according to claim 1,
wherein a size of the first circumferential end portion of the door surface is smaller than a size of the second circumferential end portion of the door surface, and the gap is formed in the foot mode position and the gap is closed in the defroster mode position.

3. An automotive air conditioning system according to claim 1,
wherein a cool air path is formed in parallel to the heating heat exchanger, and a proportion of an amount between warm air passing through a warm air path through the heating heat exchanger and cool air passing through the cool air path is adjusted by an air mix door,
wherein a foot/defroster mode which opens both the foot opening and the defroster opening is set upon rotation of the rotary door to an intermediate position between the foot mode position and the defroster mode position, wherein,
in the foot/defroster mode position of the rotary door, the second circumferential end portion of the door surface is separated from the seal surface formed on the case, so that the cool air path and the warm air path downstream of the heating heat exchanger communicate with the defroster opening through a side part of the rotary door, while at the same time, the cool air path and the warm air path communicate with the foot opening through an inside part of the rotary door,
a gap is formed between a circumferential intermediate portion of the door surface and the seal rib, and the foot opening communicates with the defroster opening through the gap.

4. An automotive air conditioning system according to claim 1,
wherein, upon rotation of the rotary door to a position where the foot opening is closed, the end surfaces of the left and right partitioning walls are located at a position intermediate between a size of the central door surface and a size of the left and right door surfaces along the diameter.

* * * * *